United States Patent [19]

Clegg

[11] Patent Number: 4,579,427

[45] Date of Patent: Apr. 1, 1986

[54] CONICAL FINDER MICROSCOPE

[76] Inventor: John E. Clegg, 2320 Keystone Dr., Orlando, Fla. 32806

[21] Appl. No.: 652,923

[22] Filed: Sep. 21, 1984

[51] Int. Cl.[4] .................. G02B 13/18; G02B 17/00; G02B 21/00

[52] U.S. Cl. .................. 350/414; 350/432; 350/445; 350/507

[58] Field of Search .................. 350/414, 432-435, 350/445, 507

[56] References Cited

U.S. PATENT DOCUMENTS

| | | | |
|---|---|---|---|
| 4,277,148 | 7/1981 | Clegg | 350/432 |
| 4,333,713 | 6/1982 | Clegg | 350/432 |
| 4,469,411 | 9/1984 | Clegg | 350/414 |

*Primary Examiner*—John K. Corbin
*Assistant Examiner*—Scott J. Sugarman

[57] ABSTRACT

Four vertical stacks of quadrant conical stage lenses mounted inside a microscope tube, and a retractable primary conical lens mounted between the stage lenses and the object. The quadrant lenses have relatively low powers of 500×, 1000×, 1500× and 2000×, and they are used to find areas of the specimen to be studied. When an area of study is located, the primary lens (50×) is inserted into the line of sight to produce a total magnification of 25,000×, 50,000×, 75,000× and 100,000×.

Eight mirrors are used to reflect the beam from the primary lens into the stacked quadrant lenses.

Conical lenses receive and emit afocal beams which are parallel to the optic axis of the lenses. Parallel afocal images can be magnified repeatedly.

1 Claim, 5 Drawing Figures

U.S. Patent
Apr. 1, 1986
4,579,427
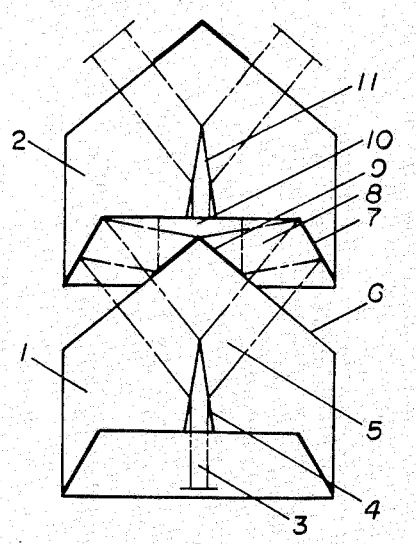
FIG. 2
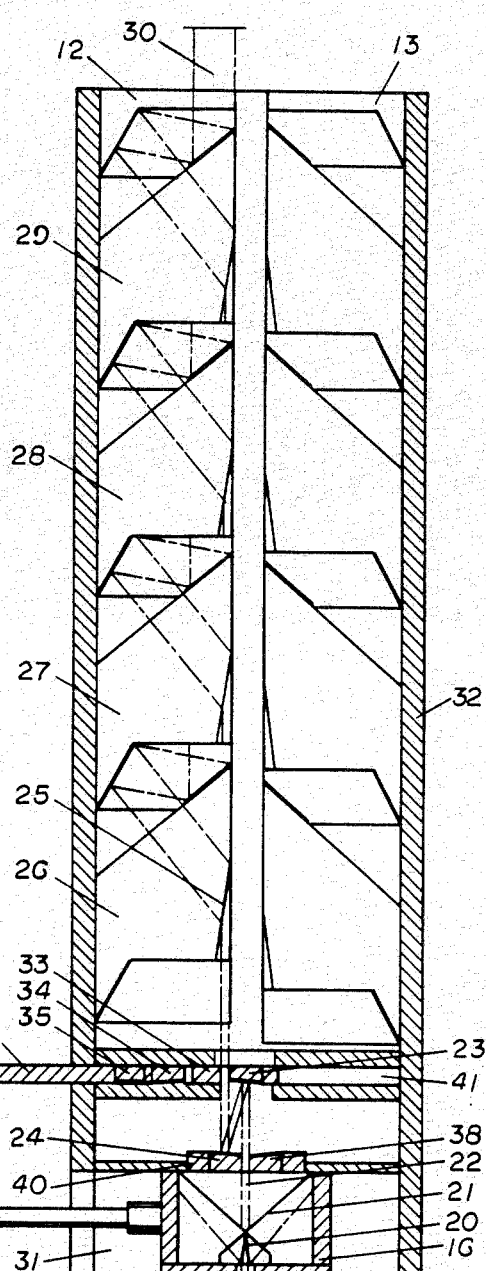
FIG. 1
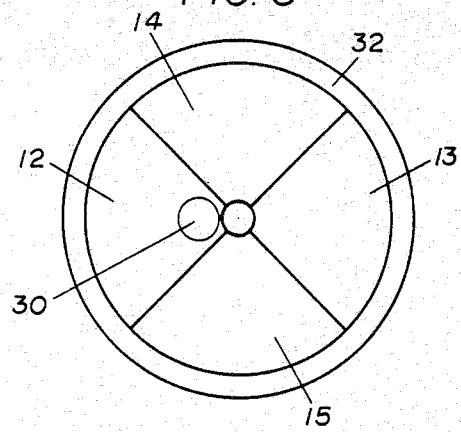
FIG. 3
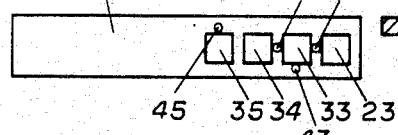
FIG. 4
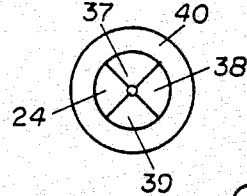
FIG. 5
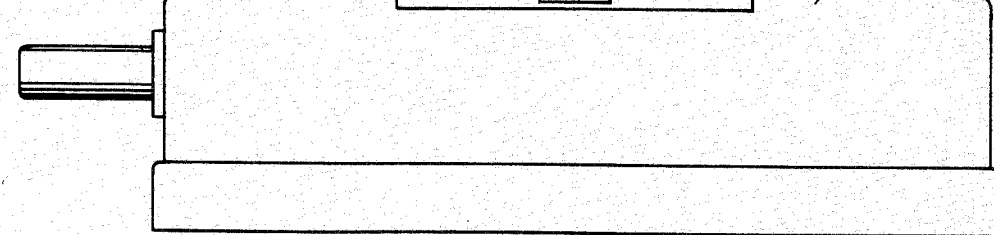

CONICAL FINDER MICROSCOPE

BACKGROUND

Prior art includes the *Quadrant Conical-Lens Microscope*, U.S. Pat. No. 4,469,411, 9/4/84; by this inventor. This microscope has two stacks of quadrant conical lenses mounted in two adjoined microscope tubes. The lenses can be revolved into and out of the line of sight to increase and decrease the power of magnification.

The lenses are disclosed in a copending application entitled *Conical Beam Concentrator*. The code designation of the concentrator is M:RT-2L:C (R—refracting section (face) of a component lens, T—transmitting section of a component lens, L—reflecting section of a component lens, M—magnifying stage lens, and C—concentrating stage lens).

DRAWINGS

FIG. 1 is an elevation of the conical finder microscope with a ray diagram.

FIG. 2 is an elevation of two whole conical stage lenses RT2L with a ray diagram.

FIG. 3 is a plan view of the upper quadrant stage lens with the emitted enlarged beam in the left quadrant.

FIG. 4 is a bottom view of the incident mirror slide.

FIG. 5 is a top view of the quadrant mirror disk.

DESCRIPTION

FIG. 2 shows two whole conical stage lens RT2L 1 and 2. Incipient beam 3 is refracted outward by concave conical section 4, forming divergent conical beam 5 which is emitted by convex conical section 6.

Beam 5 is reflected inward by concave conical reflective section 7, forming convergent conical beam 8 which is reflected upward by convex conical reflective section 9 of stage lens 1, forming enlarged whole beam 10 which is emitted parallel to the vertical axis of the lenses.

The central portion of enlarged beam 10 is refracted by concave conical section 11 of stage lens 2, and the second magnification occurs.

In the manufacture of quadrant lenses, four blank quadrant lenses are cemented together, ground as a whole lens and then separated. The power of the lenses is determined by the angle of the concave conical section. The left quadrant stack 12 of FIGS. 1 and 3 has a magnification of 500×. The right quadrant stack 13 has a magnification of 1500×. The upper and lower quadrant stacks 14 and 15 have magnifications of 1000× and 2000×.

Primary conical lens 16 has a magnification of 50×. It produces total magnifications of 25,000×, 50,000×, 75,000× and 100,000× when moved into the line of sight as shown in FIG. 1.

Operation

Incident beam 17 passes through specimen 18 mounted on microscope stage 19. Incident beam 17 is refracted outward by concave conical section 20 and refracted upward by convex conical section 21 of primary conical lens 16, forming an enlarged whole beam 22.

The central portion of beam 22 is reflected downward by incident mirror 23 to left quadrant mirror 24, and by left quadrant mirror 24 upward to concave conical section 25 of 1st quadrant stage lens 26. The beam passes through four stage lenses 26, 27, 28, 29 and is emitted as enlarged whole beam 30 with a total magnification of 25,000×.

Emitted beam 30 is afocal and is viewed from a distance of fifteen to twenty centimeters (six to eight inches).

Primary lens 16 is mounted on tracks (not shown) in compartment 31 in the base of microscope tube 32. It is retracted from the line of sight by being withdrawn to the left.

Incident mirrors 23, 33, 34, 35 are mounted in retractable incident mirror slide 36. Quadrant mirrors 24, 37, 38, 39 are mounted in fixed quadrant mirror disk 40.

The use of mirrors makes possible the projection of eight magnified images of the same area of the specimen by inserting mirror slide 36 into slide compartment 41. The beams reflected from quadrant mirrors 24, 37, 38, 39 pass through holes 42, 43, 44, 45 in incident mirror slide 36.

I claim:

1. A conical microscope comprising four vertical stacks (12, 13, 14, 15) of quadrant conical stage lenses (26, 27, 28, 29) mounted in microscope tube (32), four incident mirrors (23, 33, 34, 35) mounted on a retractable incident mirror slide (36) above the object, four quadrant mirrors (24, 37, 38, 39) mounted in a fixed quadrant mirror disk (40), and a retractable primary conical lens (16) mounted in microscope tube (32) below fixed quadrant mirror disk (40).

* * * * *